(12) United States Patent
Morsa

(10) Patent No.: US 10,346,857 B2
(45) Date of Patent: *Jul. 9, 2019

(54) NON-ABSTRACT DEVICES, SYSTEMS, AND PROCESSES FOR THE DISPLAY AND FURNISHING OF TANGIBLE BENEFITS

(71) Applicant: Steve Morsa, Thousand Oaks, CA (US)

(72) Inventor: Steve Morsa, Thousand Oaks, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 15/330,649

(22) Filed: Oct. 24, 2016

(65) Prior Publication Data

US 2018/0114229 A1    Apr. 26, 2018

(51) Int. Cl.
*G06Q 30/02* (2012.01)
*G06Q 10/06* (2012.01)
*G06Q 50/00* (2012.01)
*G06Q 10/10* (2012.01)

(52) U.S. Cl.
CPC ......... *G06Q 30/02* (2013.01); *G06Q 30/0282* (2013.01); *G06Q 10/105* (2013.01); *G06Q 50/01* (2013.01)

(58) Field of Classification Search
CPC ...... G06Q 10/105; G06Q 50/01; G06Q 30/02; G06Q 30/0282
USPC .................................................. 705/1.1–912
See application file for complete search history.

(56) References Cited

U.S. PATENT DOCUMENTS

| | | | |
|---|---|---|---|
| 4,648,037 A | 3/1987 | Valentino | |
| 4,750,121 A | 6/1988 | Halley et al. | |
| 4,969,094 A | 11/1990 | Halley et al. | |
| 5,224,173 A | 6/1993 | Kuhns et al. | |
| 5,249,044 A | 9/1993 | Von Kohorn | |
| 5,301,105 A | 4/1994 | Cummings, Jr. | |
| 5,553,155 A | 9/1996 | Kuhns et al. | |
| 5,584,025 A | 12/1996 | Keithley et al. | |
| 5,598,477 A | 1/1997 | Berson | |
| 5,696,965 A | 12/1997 | Dedrick | |
| 5,717,923 A | 2/1998 | Dedrick | |
| 5,740,252 A | 4/1998 | Minor et al. | |
| 5,761,648 A | 6/1998 | Golden et al. | |
| 5,832,447 A | 11/1998 | Rieker et al. | |
| 5,848,396 A | 12/1998 | Gerace | |
| 5,852,810 A | 12/1998 | Sotiroff et al. | |

(Continued)

FOREIGN PATENT DOCUMENTS

WO    WO 200129708 A1    4/2001

OTHER PUBLICATIONS

"Peter Martin Releases Help Works Web Edition," Business Wire, Sep. 28, 1999. (Year: 1999).*

*Primary Examiner* — Jonathan P Ouellette

(57) ABSTRACT

A system and method for permitting an entity to more effectively make use of targeted benefits from a plurality of benefit providers; wherein the benefits are offered specifically to those entities qualified and eligible to receive said benefits. Various methods and systems for matching entities with benefits are also disclosed. An exemplary embodiment includes: (1) making available a plurality of benefits; (2) examining this plurality of benefits to determine which benefits entity is or may be qualified and eligible to receive; and (3) providing notification of said "entity-is-qualified-for" benefits. Entity information is compared to benefit information to determine those benefits, if any, to which the entity is or appears to be qualified to receive.

81 Claims, 4 Drawing Sheets

(56) References Cited

U.S. PATENT DOCUMENTS

| | | |
|---|---|---|
| 5,864,822 A | 1/1999 | Baker, III |
| 5,884,272 A | 3/1999 | Walker et al. |
| 5,897,620 A | 4/1999 | Walker et al. |
| 6,009,413 A | 12/1999 | Webber et al. |
| 6,014,642 A | 1/2000 | El-Kadi et al. |
| 6,061,660 A | 5/2000 | Eggleston et al. |
| 6,067,522 A | 5/2000 | Warady et al. |
| 6,092,047 A | 7/2000 | Hyman et al. |
| 6,128,663 A | 10/2000 | Thomas |
| 6,144,944 A | 11/2000 | Kurtzman, II et al. |
| 6,154,741 A | 11/2000 | Feldman |
| 6,249,282 B1 | 6/2001 | Sutcliffe et al. |
| 6,266,648 B1 | 7/2001 | Baker, III |
| 2001/0034684 A1 | 10/2001 | Cushing et al. |
| 2002/0107849 A1 | 8/2002 | Hickey et al. |

\* cited by examiner

NON-ABSTRACT DEVICES, SYSTEMS, AND PROCESSES FOR THE DISPLAY AND FURNISHING OF TANGIBLE BENEFITS

CROSS-REFERENCED TO RELATED APPLICATIONS

This application is a Non-Provisional Continuation Application of U.S. Non-Provisional application Ser. No. 09/832,440; now U.S. Pat. No. 9,576,293; filed Apr. 11, 2001 and entitled Method and Apparatus for the Furnishing of Benefits Information and Benefits; which claims priority benefit from U.S. Provisional Application No. 60/196,335, entitled Method and Apparatus for the Furnishing of Benefits Information and Benefits, filed on Apr. 12, 2000; and U.S. Provisional Application No. 60/211,228, entitled Method and Apparatus for the Furnishing of Benefits Information and Benefits, filed on Jun. 13, 2000; all naming Steve Morsa as inventor. The disclosures of both of these Provisional Patent Applications as well as Non-Provisional application Ser. No. 09/832,440; now U.S. Pat. No. 9,576,293; are hereby incorporated by reference in their entirety for all purposes. This application is also related to and references Disclosure Document No. 475,569, entitled Method and Apparatus for the Furnishing of Benefits Information and Benefits, filed on Jun. 13, 2000, naming Steve Morsa as inventor.

STATEMENT REGARDING FEDERALLY SPONSORED RESEARCH OR DEVELOPMENT

Not Applicable

SEQUENCE LISTING OR PROGRAM

Not Applicable

REFERENCE TO A MICROFICHE APPENDIX

Not Applicable

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

This invention relates generally to a method and system for furnishing benefits and benefits information.

BACKGROUND OF THE INVENTION

Today, many governmental, non-governmental; and other agencies, organizations, groups, associations, companies, enterprises, and individuals (collectively, "benefit providers") offer targeted benefits of various types to those individuals, families, businesses, non-profits and charities, educational institutions and others (collectively, benefit-seeking "entities") whom they deem eligible, qualified and entitled to receive these said targeted benefits. These benefit providers offer all kinds of useful products, services, programs, assistance, information, money & monetary equivalents, and other "things" of value. These benefits include federal, state, and local entitlements like welfare, food stamps, rent vouchers, employment, unemployment, disability, survivor, retirement; property rehabilitation, modernization and retrofitting; government housing, grants and loans to start or grow a business; a reduced cost or free education, free or reduced cost research reports, books and materials, transportation, clothing, counseling, etc. Companies large and small offer discounts, giveaways, free premiums, free merchandise, grants, bonuses, and awards. Additional benefits offered by any number of benefit providers include free or reduced cost legal advice and services; foreclosed real estate; government jobs; police, customs, and other forced sales of personal property; reduced interest-rate real estate financing; reduced or zero down payment real estate loans; tax-sale real and personal property; educational grants, loans, scholarships, fellowships, internships, and awards; free and reduced-cost prescriptions and medical care/treatment; social security benefits; reduced price and financing for cars and other transportation; traveling and vacationing at reduced cost or for free. In total, there are literally 1000's of public and private sources offering an amazingly wide and diverse collection of such targeted benefits.

Entities become very interested in and anxious to acquire these benefits when informed of their existence yet, currently, information about these numerous benefits exist in an extremely fragmented manner and are spread out across a wide range of informational sources, including government books and manuals; public and private sector/commercial books, tapes, CDs, videos, pamphlets, reports, etc. Libraries, bookstores, and government repositories have carried any number of such benefit information resources for some years now. Today, much of this information is even available via the Internet at various government and non-governmental web sites. Yet, as helpful as these books, materials, and web sites can be in the right hands, they all still share a number of significant drawbacks which continues to make it difficult or next to impossible for the intended recipients of these numerous benefits to obtain what is available to them for their use. These problems result in a situation where the potential usefulness of these benefits has been greatly diminished and compromised.

Problem #1 is a lack of one single source to look to for all benefits. Basically, this important information is not located all in one place. To be sure no benefits were being missed would take days and weeks of research in the library; buying and digging through numerous manuals and books (some over 1000 pages long), tapes, CDs, and courses; visiting and researching web sites; and calling numerous government and non-governmental agencies, organizations, and companies; even calling elected government representatives and benefit program administrators. Though the rewards for such efforts are substantial, few have the time, energy, or knowledge needed to undertake such a "benefit trek." As a result, few do.

Problem #2 is best summarized by quoting the large, bold statement appearing on page three of one of the aforementioned benefit information books, "WARNING: THIS BOOK IS OUT OF DATE." This book goes on to explain how information is constantly changing in today's fast-paced world and how as soon as something is published, it is out of date. It's often six months to a year from the time a writer has finished their book until it's available for purchase by the benefit-seeking entity. While this timeline may be acceptable with fiction books, it's a major problem in the case of "benefit-information" books and materials.

Benefit programs are modified or discontinued . . . available funds are used up . . . new programs are constantly being created . . . benefit provider contact information changes, etc. By their very nature, it's simply impossible for standard and common printed and audio/visual materials to keep up with such on-going changes.

Problem #3 is a lack of benefit personalization. While a few benefits are available to anyone who requests them, the large majority of benefits—and many of the most valuable—are designed only to fill the needs and desires of entities meeting specified qualifications and eligibility requirements as established by the benefit providers. In the case of an individual and depending on the benefit, such factor(s) could include where that person lives (country, state, county, city, zip code, etc.); whether retired or still working; their sex; renter or owner of their residence; marital/family status; with or without children; race/nationality/ancestry/ethnic origin; citizenship status; investments currently or previously held; current or previous employer(s); potential or actual current business ownership; residency at birth and currently; active or inactive armed forces; year born, occupation; education level; income level; the presence or lack of various physical, mental, health conditions; even the personal preferences of the entity. Books and other materials require the benefit-seeking entity to try and figure out for itself whether or not it may qualify for any particular benefit. Requiring many hours of additional reading and investigation, such efforts can be difficult and frustrating.

Problem #4 is the painfully large fund and resource expenditures made by many of the benefit providers in order to locate and notify their targeted entities of the existence of one or more benefits for which the targeted entity may be qualified for. Benefit providers have only two choices in this regard. Either they can spend little or nothing and hope for the help of the media and others to "get their message out," or they can give up 20% to 50% or more of their valuable funds and resources on advertising and marketing to try and reach their targeted entities. Both options are inherently problematic; yet both are all too common, negatively impacting both the benefit providers and their targeted entities.

There is a need to provide easily accessible product/service/value benefit information (and—particularly in the case of "cash equivalents" such as vouchers, certificates, and the like—the benefits themselves) being offered by multiple benefit providers in real time to targeted entities; which said entities would otherwise find very difficult and time-consuming to locate and utilize. In this age of often daily benefit fluctuations, it is advantageous to a potential entity to be able to have accurate, real time information concerning benefit availability. As benefits availability and their respective terms, conditions, and eligibility requirements fluctuate, the importance to the entity of being able to respond to these fluctuations on a timely basis increases.

An entity could then decide in real time whether to apply for and utilize one or more available benefits while they are still available to said entity.

Accordingly, it would be desirable to provide a system whereby government and non-government product, service, program, assistance, information, value, and other benefit providers could supply their benefits in a manner which allows qualifying entities to more advantageously make use of such benefits. It is a further object of this invention to supply benefit providers with a marketing medium whereby entities seeking specific benefits may be made aware of modifications to benefits, discontinuances of benefits, and the availability of new benefits; all on very short notice; done automatically via a plurality of various "instant messaging/notification" devices/instrumentalities.

BRIEF SUMMARY OF THE INVENTION

The present invention is designed to provide an entity with real time benefit information, from a variety of benefit providers, in a format that is understandable and informative. The present invention is unique in that never before has there been a network system that conducts a search of multiple sources of benefit information, in substantially real time, and presents the results to the user in one organized presentation.

The present invention is a sophisticated computerized system by which gathered benefit information from a plurality of benefit providers may be electronically connected to a computer network. Value added software is provided at the network to assimilate the data collected from various and multiple benefit providers in substantially real time, to place the data in an understandable format for preferably a single presentation to the benefit seeking entity. The entity receives the assimilated data from the various and multiple benefit providers through an electronic connection (via modems) between the entity's computer and the network A program on the entity's computer can capture the formatted data supplied by the network and prepare it for display or analysis. In an alternate configuration the benefit providers are electronically connected to a regional host. The regional host is then electronically connected to the computer network.

The system of the present invention has many advantages over known benefit acquisition methods.

First, the present invention offers a "real time" picture of available benefits from multiple and varied benefit providers. Second, the present invention allows the display in "real time" of only those benefits for which an entity is (or appears to be) qualified to receive. Third, the present invention allows benefit providers to reduce or eliminate the often substantial costs of bringing their benefits to the attention of those entities qualified to receive them. Fourth, the present invention offers the capability to an entity of acquiring various benefit providers' benefits information, the benefit provider contact information, and the actual benefits themselves; all in one understandable and usable format that is currently not available via other methods.

A system and method is also disclosed for allowing an entity to discover what benefits said entity would be qualified to receive if entity data contained one or more inaccurate, "phantom" data factors, e.g., an incorrect current entity location; which could help entity to decide whether or not to relocate to a new city, state, area, country, etc.; entity's decision of whether or not to move then wisely based at least in part on the benefits available to entity at the contemplated new location.

A method according to this alternate embodiment includes: (1) creating an alias location record based on the new location entity is contemplating moving to; and (2) making available the resultant alias benefit information for entity's viewing.

A system and method is also disclosed for allowing an entity to discover what benefits an entity other than said entity is qualified to receive. An example of this would be an adult man whose mother is blind, infirm, or otherwise unable to make use of the system on her own. By allowing the son to input the needed entity data of his mother, the potentially important and valuable benefits for which the mother qualifies for can be readily obtained.

A method according to this alternative embodiment includes: (1) creating an alias set of entity data based on someone other than a given entity; and (2) making available the resultant alias benefit information for given said entity.

The use of other phantom entity data in this or similar manners will reveal additional benefit information which will also prove useful and valuable to entity.

Further aspects of the present invention will become apparent during the course of the following description and by reference to the attached drawings.

DETAILED DESCRIPTION OF THE INVENTION

Reference will now be made in detail to an implementation of the present invention illustrated in the accompanying drawings. Wherever possible, the same reference numbers will be used throughout the drawings and the following description to refer to the same or like parts.

Standard components preferably include conventional computers; telecommunication and data communication services; and input and output devices such as telephones, computer terminals, printers, and facsimile machines. The architecture for and procedures to implement data handling among these machines, however, are not conventional, as they provide for distribution of benefit information and benefits.

Figure 1:
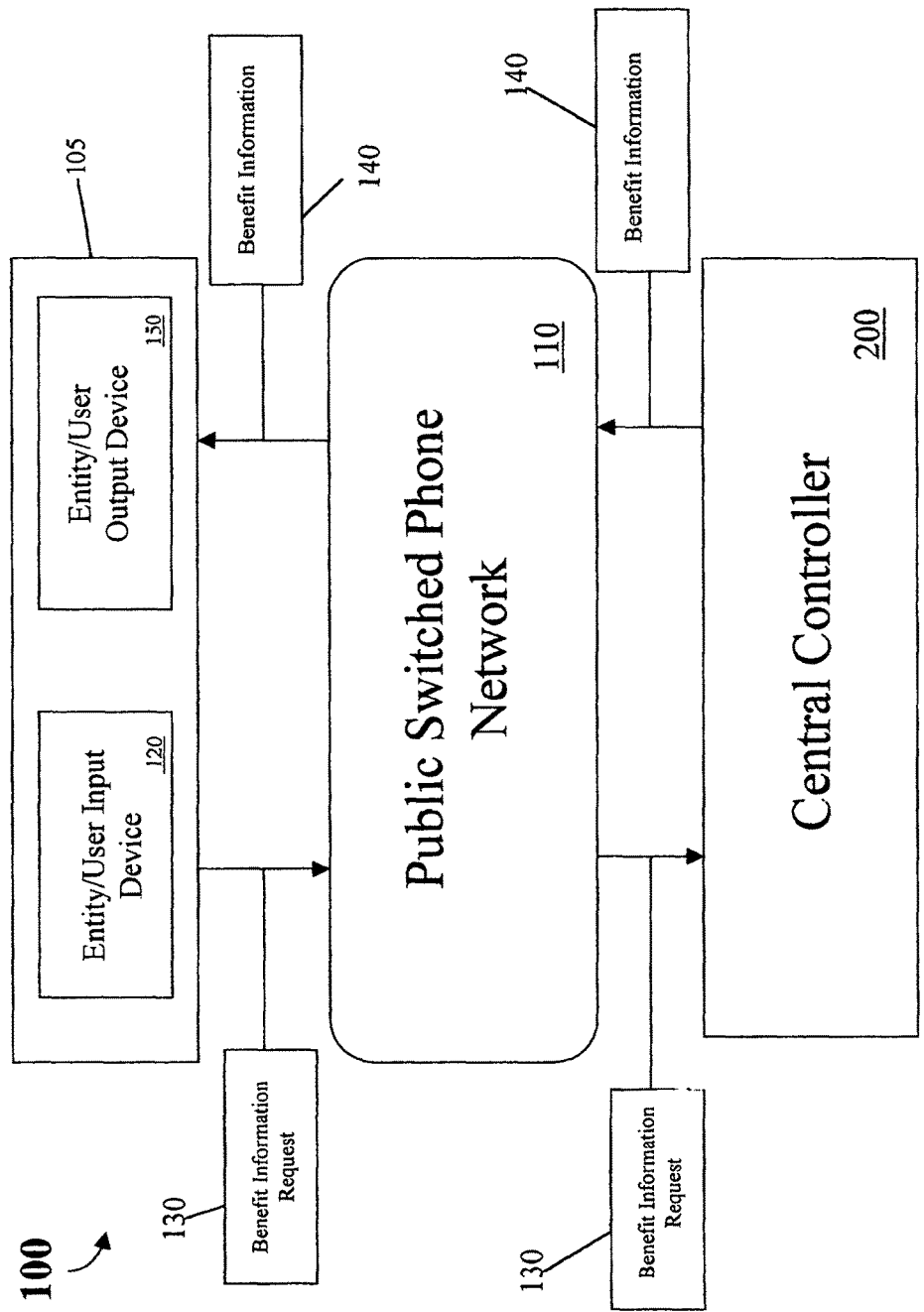
FIG. 1 is a block diagram of a benefit information distribution system according to an implementation of the present invention.

According to the present invention, a computerized system is shown in FIG. 1 which permits entities to more effectively make use of a variety of available benefits from a plurality of goods, services, information, and value benefit providers.

As used herein, the term "benefits" shall be understood to mean any discounted rate or any other added value available to an entity in addition to those otherwise offered to the general public, businesses, non-profits and charities, governments, educational institutions families, and any other entities. "Entities" shall be understood to mean individuals, businesses, non-profits, charities, governments, educational facilities, and families; including any and all other agencies, groups, organizations, enterprises, etc.; and also including two or more of any of these entities acting together and in concert with one another.

The invention allows entities to make advantageous use of such benefits offered by benefit providers by correlating the specific benefits offered with the demographic, geographic, psychographic, and preference data for each entity.

FIG. 1 is a block diagram of benefit information distribution system 100 according to an implementation of the present invention. As illustrated, system 100 includes user location 105, public switched telephone network 110, and central controller 200. User location 105 includes a user input device 120, which, as illustrated, may be a computer. User location 105 also includes a user output device 150, which, as illustrated, may be a computer terminal. Those skilled in the art will recognize that user input device 120 may be any electronic input device connectable to central controller 200, such as a telephone, facsimile machine, TV with set-top box (Web TV, etc.), cell phone, PDA, or a touch-screen display or other graphical user interface (GUI) for connecting to central controller 200 via public switched telephone network 110. Similarly, user device 150 may be any type of output device such as a printer, facsimile machine, TV, cell phone, PDA, etc. Output device 150 also represents an e-mail address, website, or the like, to which central controller 200 may send requested information. Although a single user input device and single user output device is shown in FIG. 1, it is to be understood that any number of user input devices and user output devices could be coupled to an appropriate central controller 200. It is to be additionally understood that input device 120 and output device 150 may be one in the same device as in the case of a computer, telephone, cell phone, PDA, etc.

Public switched telephone network 110 is a conventional public switched telephone network of the type operated by telephone companies like AT&T, MCI, General Telephone Sprint, etc.

Lastly, central controller 200 includes a conventional server computer system that responds in near real time to requests for stored information. Central controller 200 also executes software to store and manage benefit information related to benefit providers; and to distribute the stored information upon request.

As shown in FIG. 1, an entity/user transmits a request using user input device 120. The request initiates a process to locate, retrieve, and transmit to the entity/user benefit information which entity qualifies to take advantage of.

Central controller 200 receives the user's request via public switched telephone network 110. Central controller 200 determines whether any benefit information 140 corresponding to the received benefit information request 130 exists. If so, central controller 200 retrieves the requested benefit information from a benefit information database, and sends the retrieved benefit information 140 to a user-specified location, such as user output device 150. Those skilled in the art will recognize that user input device 120 and user output device 150 may be at different locations, in which case the request transmitted to central controller 200 would include an identity and/or location of user output device 150 to which benefit information should be sent. Additionally, as discussed below, users pre-register with central controller 200 before it will provide requested benefit information. As part of the registration process, the users may specify a preferred output device to which central controller 200 will transmit any requested benefit information.

Figure 2:
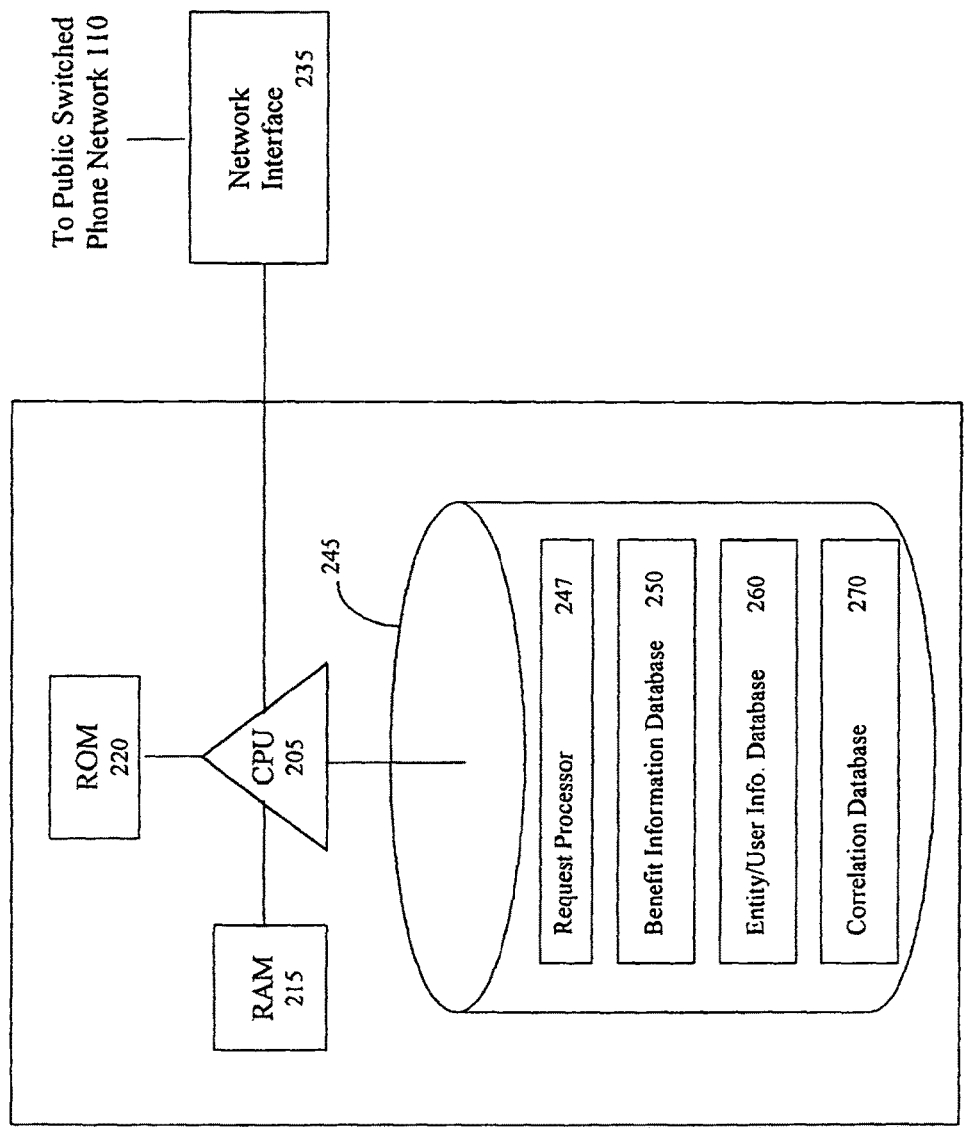
FIG. 2 is a block diagram of the components of a central controller used by the benefit information distribution system of FIG. 1.

FIG. 2 is a block diagram of the components of central controller 200. Central controller 200 is connectable to a conventional network interface device 235, to connect central controller 200 to public switched telephone network 110. At the heart of central controller 200 is CPU 205. CPU 205 connects to RAM 215, ROM 220, and storage device 245. CPU 205 represents one or more suitable microprocessors (such as the Pentium® processor manufactured by Intel Corporation) or other electronic processing unit as is well known to those skilled in the art. RAM 215 and ROM 220 are also conventional. CPU 205, RAM 215, and ROM 220 are used in conventional ways to process requests for benefit information in accordance with stored instructions, i.e., computer software.

Storage device 245 is a conventional mass storage device such as a hard disk. It may also include multiple mass storage devices, including both read-write devices and write-once read many times devices like optical disk drives or other suitable medium. Storage device 245 includes a request processor 247 and multiple databases 250-270.

Request processor 247 constitutes computer software executed by CPU 205 for processing the requests for benefit information. Using information maintained by databases 250-270, CPU 205 processes requests for benefit information in accordance with instructions of request processor 247.

Storage device 245 also includes a benefit information database 250, an entity/user information database 260, and a correlation database 270. Databases 250-270 may include various types of database structures. The preferred database structure is a relational database because it provides rapid responses to requests for benefit information.

In general, benefit information database 250 stores benefit information offered by a plurality of goods, services, information, and value benefit providers. It generally includes a list of the certain specific governments, agencies, organizations, companies, etc. which are making available one or more certain specific benefits for targeted entities/users. Database 250 benefit information may be (1) gathered via phone, mail, FAX, e-mail, an internet, web sites, etc. from the benefit providers and/or (2) inputted directly into database 250 through electronic or other means by the benefit providers themselves and/or (3) gathered from or inputted directly by some other third-party intermediary acting on behalf of the benefit providers. Entity/User information database 260 contains demographic, geographic, psychographic, and preference data information on entity/users who have registered to receive benefit information. Lastly, correlation database (or sub-database) 270 contains detailed specific information for each benefit offered by each benefit provider that permits CPU 205 to, (1) determine whether a particular benefit is or may be available for the possible use by a particular entity, and (2) to readily retrieve correlation data for a specifically identified benefit. It is to be understood that any suitable electronic or other suitable means can be utilized for coupling CPU 205 to ROM 220, RAM 215, storage device 245, and network interface 235.

Significantly, in a preferred embodiment, the system is particularly advantageous in that it does not need and can be designed to omit generally unpopular, privacy-invasive entity/user identification information in order to provide the desired benefit information to entity/user. In such a preferred embodiment, the benefit information desired by user is readily supplied without user's name, social security number, street address, and other such "private" information being revealed by the entity/user. Alternatively, some or all of this "private" information may be required in order to obtain at least some of the entity/user desired benefit information and/or the benefits themselves.

The various hardware requirements for the system as described herein can generally be satisfied by any one of many commercially available high speed personal computers offered by companies such as Dell, Compaq, IBM, or Apple. The specific electronic and magnetic hard drive memory requirements for the system depend upon the volume of benefits to be tracked by the system as well as the number of entity users. Likewise, processing speed can be chosen to provide a suitable combination of speed and cost effectiveness for the anticipated demands to be placed upon the system. Alternatively, any other type of computer with sufficient processing speed and memory capability can also be used for the purposes of the invention In a preferred embodiment, the system can be designed to operate with any specifically chosen computer operating system such as Windows, MS DOS, Linux, UNIX, MAC OS, etc. In this regard, it should be understood that the system as disclosed herein is an "application program" which can be designed to operate with practically any conventional and commercially available computer operating system. Further, the system as designed herein can be implemented by any programmer of ordinary skill in the art using commercially available development tools for the operating systems described above.

It should be understood that the specific input data required to obtain benefit information can be varied as necessary, provided such data is sufficient to allow processor 205 to accurately obtain correlated benefit data. Information relating to entities, benefits, benefit providers, and correlation data may be arranged in storage device 245 in any convenient format or form. Suitable data structures and search routines for accomplishing this purpose are well within the knowledge of those of ordinary skill in the art. Any suitable data structures and search routine may be used, provided that it enables processor 205 to search for and locate correlated benefit information applicable to a specific entity/user.

Accordingly, no attempt shall be made herein to describe all of the various organizational methods and programming techniques by which such information can be arranged and retrieved. Instead, FIG. 2 merely shows one possible example of a manner in which the information could be organized for use in connection with the invention.

In a preferred embodiment, the system is capable of identifying benefit information formatted such that the user's benefits are listed under specific classes or categories such as: "Housing," "Education," "Medical," "Employment," "Travel," "New (benefits)," etc. Alternatively, the benefits may be listed according to their value to the user, the costs (if any) to utilize the benefits, ease of use of the benefits, expiration dates of the benefits, physical proximity of the user to the benefit providers, etc.

Figure 3:
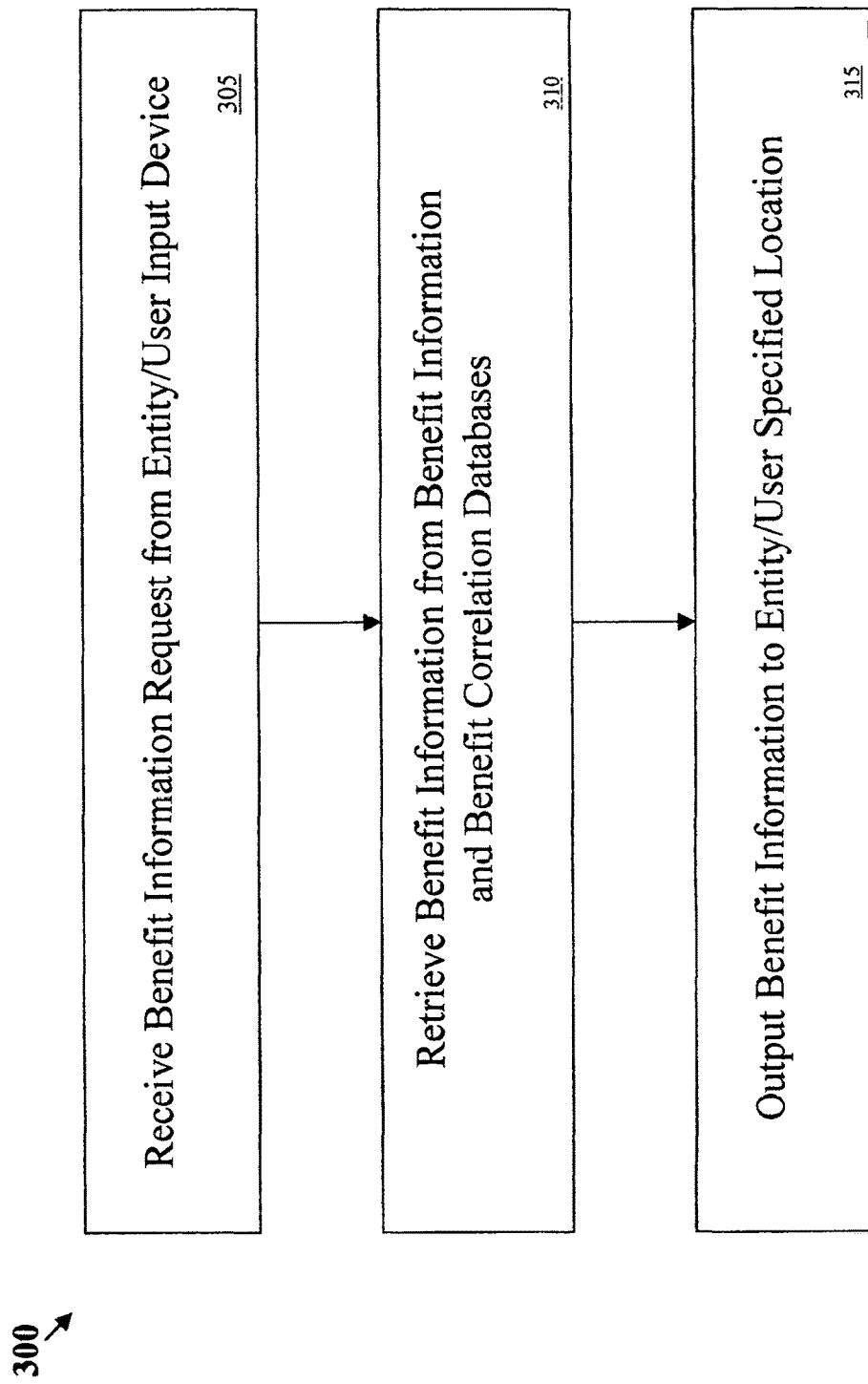
FIG. 3 is a flow chart of an operation of the benefit information distribution system to process requests for benefit information.

FIG. 3 is a flow chart of the general procedure 300 used by central controller 200 to provide benefit information using databases 250-270. Central controller 200 first receives a request for benefit information from a user input device such as a computer or telephone (step 305). Central controller 200 uses the input information to retrieve any benefit information from benefit information database 250 and benefit correlation database 270 (step 310). Central controller 200 then outputs the located benefit information to a specified user output device (step 315). The output device may be specified by the user as part of the initial request for benefit information or an output device specified for the user in user information database 260. Further, central controller 200 charges user's credit or debit card(s) and updates billing information in user information database 260 to reflect the "purchase" (transmission) of requested benefit information.

It is to be understood that numerous other alternative charging/billing and income-generation methods may be used without detracting from the scope of the present invention, e.g.; supported by users via periodic subscription ("X" dollars per month, per year, etc.), flat-fee per use, per time interval (by the minute, hour, etc.), per benefit(s) received, a percentage of benefit(s) utilized, "900" caller/user pay phone number, etc.; and/or supported via one or more of the benefit providers on a per benefit viewed, per-benefit utilized basis, etc.; and/or supported via common online/offline advertising and marketing revenue sources; optionally including ads and marketing messages placed within the body of personalized/customized printed, electronically stored, etc. benefit information "storage" devices (books, CDs, floppy disks, hard drives, etc.). Alternatively, one or more benefit information listings and/or benefits and/or access to one or more entity/users and/or access to one or more benefit providers could be made available at no cost to one or more of the benefit providers and/or at no cost to one or more of the entity/users.

Suitable revenue structures and income generation methodologies for use in conjunction with the present invention are well within the knowledge of those of ordinary skill in the art. Accordingly, no attempt shall be made herein to describe all of the various income generation and charging/billing techniques which may be used in conjunction with the present invention.

Figure 4:
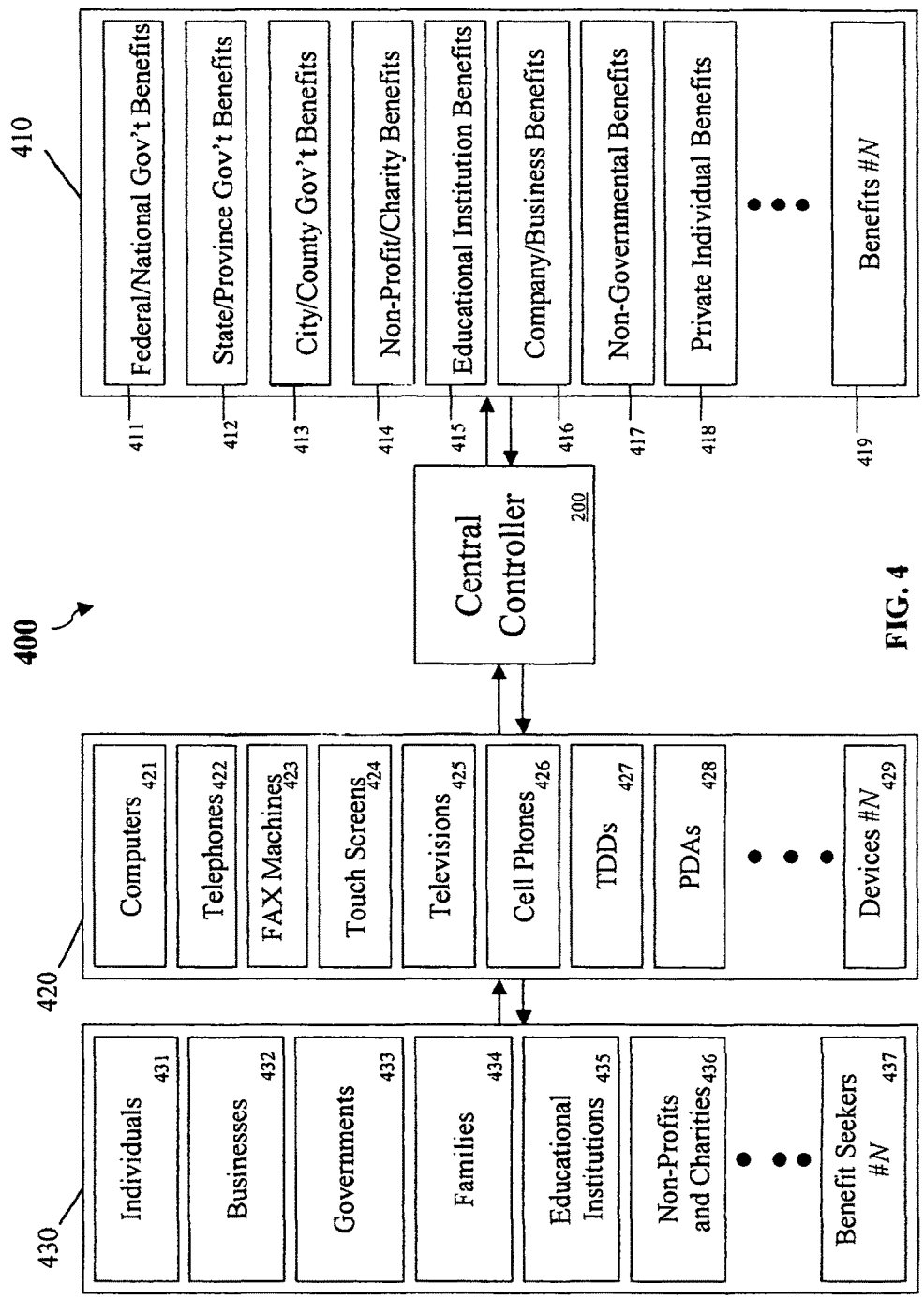
FIG. 4 is a block diagram of the components of a benefit-information/benefit acquisition and distribution system according to an implementation of the present invention.

FIG. 4 is a block diagram of the components of a benefit-information/benefit acquisition and distribution system 400. As shown in FIG. 4, central controller 200 may receive a plurality of benefit information from a plurality of benefit providers (operating from a plurality of locations) 410. These 411-419 benefit providers are shown listed by class ("Federal/National Gov't 411," "State/Province Gov't 412," "City/County Gov't 413," etc.), but may also include any entity of any form or type which is offering one or more targeted benefits to one or more benefit seeking entities. Central controller 200 may be further connected by electronic or other means to a plurality of user input/output devices (operating from a plurality of locations) 420. These 421-429 devices may be of the type shown ("Computer 421," "Telephone 422," "FAX machine 423," etc.), but may also include any device capable of allowing the system user to input the requisite entity data and receive the resultant benefit information output; optionally including said output to printing-enabled devices for the creation of a customized/personalized physically printed (report, book, etc.) or electronically printed (floppy-disk, CD, etc.) or electronically or otherwise stored (within a computer hard drive, etc.) permanent record of said benefit information. A plurality of benefit-seeking system users (located in a plurality of locations) 430 may be listed by "entity type" as shown in FIG. 4 ("Individuals 431," "Businesses 432," "Governments 433," etc.); but these benefit-seekers 431-437 may also include any entity type desiring to discover what, if any, benefits said entity qualifies for.

In one embodiment, the system is capable of allowing benefit provider(s) 410 to, where practicable, deliver their benefits directly through central controller 200 to benefit-seeking users 430 via printing-enabled input/output devices 420. Generally, this is possible when the benefits provided include checks; monetary equivalents such as food stamps, certificates, coupons, rebates and the like; as well as "informational"-type benefits such as reports, books, etc.; and including floppy disks, CDs, etc. (where the benefit can be transmitted to and stored electronically).

It is to be understood that where terms such as "Federal," "State," "City," etc. are used in 410 in relation to governments that equivalent terms depending on the government entity(ies) applicable to a given system user are also included in the invention.

In another embodiment, central controller 200 may be utilized to assist system user 430 in obtaining one or more of the benefits 410 user qualifies for. This could include supplying any application or other forms required by the benefit providers in order to receive their offered benefits, assist in the completion and submission of said forms, etc. Such assistance is likely to further increase the already obvious advantages the present invention offers.

In a preferred embodiment, the system includes means to notify system users, via suitably enabled input/output devices 420, of any modification or elimination of existing benefits; or the availability of any new benefits; or the pending modification or elimination of existing benefits or pending availability of new benefits. In this way users 430 will be constantly kept up to date on the benefit(s) or benefit class(es) most important to them.

Another significant advantage of the present invention, besides the above obvious benefits, is the opportunity for the above-described system 100 to itself become a benefit provider. It may do so by having the system operator negotiate directly with benefit providers to offer their benefits to the system's entity/user database.

Thanks to the relatively short lead times required, an additional further advantage of the system is its ability to offer and provide benefits which may be created on short notice simply by adding the benefits and their corresponding correlation information to central controller 200. This would enable both benefit providers and benefit seekers to take advantage of short-term opportunities and changing conditions. As an example, a city government might realize that a first-time homebuyer loan program they're offering is about to expire with unused funds still in the account.

The city could liberalize the terms/conditions of the loan program sufficiently to quickly induce, especially by utilizing the above described user update notification system, a sufficient number of additional buyers to use up the remainder of these targeted funds. This advantage of the system reveals another related advantage of the system; namely that benefit providers are now able to, when desired, "fine tune" the amount of—and rate of use of—their benefits simply by varying the terms and conditions of their benefits as needed in order to better meet the intentions and disbursement goals set for these benefits. Again using the above city loan program example; if the funds were still not being used up quickly enough with the first interest rate cut, the city could reduce the interest rate another ½% and/or reduce the associated loan fees in order to induce even more buyers to quickly utilize the city's loan program. Through this marketplace-sensitive, quasi-"benefit-auction" use of the system, the common problems of "left over money/benefits" and "more qualified benefit seekers than money/benefits available to supply them" can effectively be remedied.

Example

An example of the present invention in use for a given entity will help better explain the unique aspects of the invention. In this brief scenario, the entity is an individual named "Dawn," an Internet surfer who has recently signed on the service provided in accordance with the present invention and who now is seeking to find out what benefits she is entitled to receive. Dawn logs her computer onto the network host utilizing interface management software provided by the network host (or dials into system via her telephone). Dawn then completes a personal profile questionnaire asking her for demographic, psychographic, geographic, and preference data. These may include such questions as Dawn's city or zip code, her income, marital/familial status, education, housing (renter, owner); type of housing: apartment, single-family home, co-op, townhome;

birth date, nationality, occupation, any medical conditions or health needs, etc.; as well as her personal hopes, dreams, and interests/preferences.

Upon her submission of this profile (e.g., by "clicking" on the indicated "submit request" or similar icon; or via telephone by speaking with a live "operator," or via an interactive voice response unit [IVUR]), etc., the interface formats these parameters and transmits her request for benefits to the network host. The network host, through network software, accesses the network database(s); which is (are) updated in substantially real time with previously gathered benefit information concerning various benefits available from various benefit providers. The network host then processes the information into a usable protocol that enables the entity interface management software to provide the data to Dawn in an appropriate presentation. Dawn's computer (or telephone, FAX machine, etc.) then receives the processed information from the network host and displays the benefit information for her in real time.

For example, the benefits she qualifies for could include a zero-down payment, first-time home-buyer program offered by her city or state (helpful since she's tired of renting and is getting married soon), printing off the loan application and accompanying city certificate for her probable use; a possible job with the city fire department (could be an interesting career); an SBA micro-loan program for women entrepreneurs (maybe starting her own business is the way to go) an internship at the local college (in case she wants to further her education), the in-depth details of which she carefully reviews on her computer screen; a promising new treatment for Alzheimer's disease (good news for her elderly father), information about which she e-mail forwards to her dad; notice of an upcoming customs sale (Dawn's heard there's some real money to be made reselling that stuff); a great deal at the local music store on a new piano (she's always wanted to take lessons); a federally-sponsored program that buys up old "clunker" cars to reduce air pollution (her smog-belching car is on its last legs); a reduced-rate, new-car loan program available from the local car dealership for recent college grads (she'll have to replace her clunker somehow), details about which she stores to a floppy disk; federal prescription program for the infirm (something her aunt could really use); a local program to help working single moms afford quality daycare for their kids (the kind of program her sister really needs), the state voucher for which she prints off and gives to her sister; notice of next month's upcoming county tax defaulted real estate sale (to go along with her zero down home loan), which list of properties Dawn stores to her hard drive; and a "two-for-one" ticket sale at the local opera (could be just the incentive needed to get Dawn's fiancé to at least give opera a chance), the coupon for which she prints off to take with her to the opera house.

Optionally, Dawn may request real time updates of the benefit information via such means as e-mail, FAX, pager, hard-line or web-enabled phone, PDA (Personal Digital Assistants such as the Palm®), etc. Then, the benefit information applicable to her will be automatically updated as the information gathered from the benefit providers is updated. Such updates may also occur as, for example, due to the passage of time as when Dawn reaches various ages; since a number of benefits are generally known to be at least partially age-based. In addition, Dawn's profile may be adjusted and updated from time to time by Dawn and/or the system operator. The result is that Dawn has real time or near real time access in a readily understandable format, on a single display screen (or other single "benefit touch point") of all the benefits for which she is qualified to receive. Regardless of the source(s) of those benefit(s).

The service provided by the present invention can be offered with a variety of entity-pay and/or benefit providers-pay and/or advertisers/sponsors-pay options; or can be offered free to the entity and/or free to one or more of the benefit providers.

The many features and advantages of the present invention are apparent from the detailed specification, and thus, it is intended by the claims to cover all such features and advantages of the invention which fall within the true spirit and scope of the present invention.

While the invention has been described in connection with what is presently considered to be the most practical and preferred embodiment, it is understood that the invention is not to be limited to the disclosed embodiment. This description is not intended to be exhaustive or to limit the invention to the precise form disclosed. For example, although the preferred instantiation of the equipment or "viewer" the entity/user uses to communicate with comprises a general-purpose desktop computer or the like, other equipment (e.g., a television with set-top box, telephone, FAX machine, or a dedicated display device) could be used instead. Moreover, although the preferred instantiation of the "viewer" is connected to the other components of system 100 via the public switched phone network 110, other forms and sub-forms of connection (e.g., an internet, cable TV, satellite/electronic broadcast, on-line systems, local-area networks, wide-area networks; as well as via physically distributed and individualized/personalized "books," "floppy" disks, CD-ROMS, etc.) are also readily supported.

The present invention thus provides a practical and economically feasible system for benefit providers to provide their benefits to those targeted entities qualified/eligible/entitled to receive them; while at the same time allowing benefit seekers to finally have access to (and optimally, to use) up to all the many benefits for which they're qualified/eligible/entitled to receive. This is accomplished by providing both benefit providers and benefit seekers with a simple means and mechanism to more quickly, easily, and efficiently come together for the mutual benefit of both.

Furthermore, since numerous modifications and variations will readily occur to those skilled in the arts once this invention is known to the arts, it is not desired that the present invention be limited to the exact construction, operation, and implementation illustrated and described herein, and accordingly, all suitable modifications and equivalents which may be resorted to are intended to fall within the spirit and scope of the claims.

What is claimed is:

1. A technology and computing improving, tangible, non-abstract system for permitting an entity to make use of benefits, the system comprising:
   receiving in at least one physical memory device (i) at least a sub-set of an entity's demographic, geographic, and psychographic data, (ii) benefit data for benefits which are offered to those entities meeting the specified qualifications and eligibility requirements as established by the benefit providers, and (iii) benefit provider data;
   storing in at least one physical memory device (i) the entity's data, (ii) the benefit data, and (iii) the benefit provider data;
   inputting at least the entity's data into a processing device by means of at least one data entry device in electronic communication with the processing device;

said processing device analyzing (i) the entity's data, (ii) the benefit data, (iii) the benefit provider data, and benefit correlation data in real or substantially real time to determine whether any benefit providers are offering any benefits applicable to the entity's data;

determining that the entity qualifies for at least one benefit from at least one benefit provider;

generating a message to a web-enabled phone to inform the entity of the at least one benefit applicable to the entity's data;

anytime thereafter, receiving data indicating that entity is at a new geographic location;

generating a new message to a web-enabled phone to inform the entity of at least one new, different benefit which was not previously but is now available to entity due at least in part to entity's new geographic location;

wherein at least one of both the message benefit(s) and the new-message different benefit(s) are from the group consisting of coupons, discounts, giveaways, free premiums, free merchandise, rebates, certificates, welfare, food stamps, rent vouchers, employment/unemployment, disability, survivor, retirement; property rehabilitation, modernization and retrofitting; government housing, grants and loans to start or grow a business; a reduced cost or free education, free or reduced cost research reports, books and materials, transportation, clothing, counseling, grants, bonuses, awards, free or reduced cost legal advice and services, foreclosed real estate, government jobs; police, customs, and other forced sales of personal property; reduced interest-rate real estate financing; reduced or zero down payment real estate loans; tax-sale real and personal property; educational grants, loans, scholarships, fellowships, internships, and awards; free and reduced-cost prescriptions and medical care/treatment; social security benefits; reduced price and financing for cars and other transportation; traveling and vacationing at reduced cost or for free.

2. The system of claim 1, further comprising:
wherein at least one of the benefits provided by at least one of the benefit providers is received directly into the system.

3. The system of claim 1, further comprising:
wherein at least one of the benefits provided by at least one of the benefit providers is received into the system from a third-party intermediary acting on behalf of at least one of the benefit providers.

4. The system of claim 1, further comprising:
anytime thereafter receiving data indicating a change in entity's demographic and/or psychographic data but without a change in entity's geographic location;
followed by generating a new message to a web-enabled phone of at least one new, different benefit available to entity due at least in part to entity's changed demographic and/or psychographic data.

5. The system of claim 1, wherein the entity qualifies for at least one additional benefit; or for an improvement in the terms and/or conditions of at least one benefit; through the aggregation of the entity with at least one additional entity.

6. The system of claim 1, further comprising generating a message to a device notifying the entity of at least one of the following:
(i) a modification or elimination of at least one of the benefits;
(ii) the availability of at least one new benefit;
(iii) the pending modification or elimination of at least one existing benefit;
(iv) the pending availability of at least one new benefit.

7. The system of claim 1, further comprising generating to a web-enabled device at least one from the group consisting of:
at least one benefit application form required by at least one of the benefit providers;
a communication connection to at least one of the benefit providers;
an approval of entity to receive one or more benefits from one or more benefit providers;
an acknowledgement of an acceptance of at least one of the benefits by the entity;
a notification of the utilization of at least one benefit by the entity.

8. The system of claim 1, further comprising receiving entity's social security or other tax ID number in order to receive at least one benefit from at least one benefit provider.

9. The system of claim 1, further comprising wherein at least one of entity's data is phantom data.

10. The system of claim 1, wherein at least one of the benefits is printable.

11. The system of claim 1, wherein at least one benefit is available based at least in part on the physical proximity of the entity to one or more of the benefit providers.

12. The system of claim 1, wherein at least a sub-set of an entity's data is received from one or more of the group consisting of computer, telephone, fax machine, touch screen, television, cell phone, TDD, or PDA.

13. The system of claim 1, wherein at least a sub-set of an entity's data is received from at least one web-enabled phone.

14. The system of claim 1, wherein at least one benefit provider is from the group consisting of a company/business, a government, a non-profit/charity, an educational institution, or a private individual.

15. A technology and computing improving, tangible, non-abstract system for permitting an entity to make use of benefits, the system comprising:
receiving in at least one physical memory device (i) at least a sub-set of an entity's demographic, geographic, and psychographic data and (ii) benefit and benefit provider data, the benefits being offered by benefit providers to those entities meeting the specified qualifications and eligibility requirements as established by the benefit providers;
storing in at least one physical memory device (i) the entity's data and (ii) benefit and benefit provider data;
inputting at least the entity's data into a processing device by means of at least one data entry device in electronic communication with the processing device;
said processing device analyzing the entity's data, the benefit and benefit provider data, and benefit correlation data to determine whether any benefit providers are offering any benefits applicable to the entity's data;
determining that the entity qualifies for at least one benefit from at least one benefit provider;
generating a message to a receiving device to inform the entity of the at least one benefit applicable to the entity's data;
wherein at least one of the benefits provided by at least one of the benefit providers is received directly into the system;
wherein at least one of the benefits provided by at least one of the benefit providers is received into the system from a third-party intermediary acting on behalf of at least one of the benefit providers;

wherein at least one of the benefits is a printable benefit from the group consisting of coupon, rebate, certificate, grant, bonus, award.

16. The system of claim 15, further comprising:
anytime thereafter, receiving data indicating a change in entity's demographic, geographic, or psychographic data; and then
generating a new message to a receiving device of at least one new entity benefit available to entity due at least in part to entity's now changed data.

17. The system of claim 15, further comprising generating a message notifying the entity of at least one of the following:
(i) a modification or elimination of at least one of the benefits;
(ii) the availability of at least one new benefit;
(iii) the pending modification or elimination of at least one existing benefit;
(iv) the pending availability of at least one new benefit.

18. The system of claim 15, further comprising supplying at least one benefit application form required by at least one of the benefit providers.

19. The system of claim 15, further comprising receiving entity's social security or other tax ID number in order to receive at least one benefit from at least one benefit provider.

20. The system of claim 15, further comprising wherein at least one of entity's data is phantom data.

21. The system of claim 15, wherein at least one benefit is available based at least in part on the physical proximity of the entity to one or more of the benefit providers.

22. The system of claim 15, wherein at least one benefit is available based at least in part on the entity's geographic location relative to at least one benefit provider's geographic location.

23. The system of claim 15, wherein at least one benefit is from the group consisting of a coupon, a discount, a giveaway, a free premium, free merchandise, a rebate, a certificate, a grant, a bonus, an award, reduced interest-rate real estate financing; a reduced or zero down payment real estate loan; a free or reduced-cost prescription, free or reduced-cost medical care/treatment, a reduced price or financing for cars or other transportation; traveling and vacationing at reduced cost or for free.

24. The system of claim 15, wherein at least a sub-set of an entity's data is received from; and/or benefits data delivered to; one or more of the group consisting of computer, telephone, fax machine, touch screen, television, cell phone, TDD, or PDA.

25. The system of claim 15, wherein at least a sub-set of an entity's data is received from at least one web-enabled phone.

26. The system of claim 15, wherein at least one benefit provider is from the group consisting of a company/business, a government, a non-profit/charity, an educational institution, or a private individual.

27. A technology and computing improving, tangible, non-abstract process for permitting an entity to make use of benefits, the process comprising:
receiving in at least one physical memory device (i) at least a sub-set of an entity's demographic, geographic, and psychographic data, (ii) benefit data for benefits which are offered to those entities meeting the specified qualifications and eligibility requirements as established by the benefit providers, and (iii) benefit provider data;
storing in a physical memory device (i) the entity data, (ii) the benefit data, and (iii) the benefit provider data;
inputting (i) the entity's data, (ii) the benefit data, and (iii) the benefit provider data into a processing device by means of at least one data entry device in electronic communication with the processing device;
said processing device analyzing (i) the entity's data, (ii) the benefit data, and (iii) the benefit provider data in real or substantially real time to determine whether any benefit providers are offering any benefits applicable to the entity's data;
determining that the entity qualifies for at least one benefit from at least one benefit provider;
generating a message to a web-enabled phone which informs the entity of one or more benefits entity qualifies for;
anytime thereafter, receiving data indicating that entity is at a new geographic location;
generating a new message to the web-enabled phone which informs the entity of at least one new, different benefit which was not previously but is now available to entity due at least in part to entity's new geographic location;
wherein at least one of both the message benefit(s) and the new-message different benefit(s) is from the group consisting of a coupon, a discount, a giveaway, a free premium, free merchandise, a rebate, a certificate, a grant, a bonus, an award, reduced interest-rate real estate financing; a reduced or zero down payment real estate loan; a free or reduced-cost prescription, free or reduced-cost medical care/treatment, a reduced price or financing for cars or other transportation; traveling and vacationing at reduced cost or for free.

28. The process of claim 27, further comprising displaying the benefits to the entity in a manner selected from the group consisting of benefit class or category; value of benefits; cost, if any, of benefits; importance of benefits; relevance of benefits; ease of use of benefits; expiration date, day, time of benefits; creation date, day, time of benefits; type of benefits; physical proximity of the entity to one or more of the benefit providers.

29. The process of claim 28, further comprising the step of entity self-selecting said manner of displaying the benefits.

30. The process of claim 27, wherein at least one benefit is available to entity based at least in part on the physical proximity of the entity to one or more of the benefit providers.

31. The process of claim 27, wherein the entity utilizes at least one of the benefits.

32. The process of claim 27, wherein at least one of the benefits provided by at least one of the benefit providers is received directly into the system.

33. The process of claim 27, wherein at least one of the benefits provided by at least one of the benefit providers is received into the system from a third-party intermediary acting on behalf of at least one of the benefit providers.

34. The process of claim 27, further comprising generating a message to a web-enabled phone notifying the entity of at least one from the group consisting of:
(i) a modification or elimination of at least one of the benefits;
(ii) the availability of at least one new benefit;
(iii) the pending modification or elimination of at least one existing benefit;
(iv) the pending availability of at least one new benefit.

35. The process of claim 27, further comprising supplying to a web-enabled phone at least one benefit application form required by at least one of the benefit providers.

36. The process of claim 27, further comprising receiving entity's social security or other tax ID number in order to receive at least one benefit from at least one benefit provider.

37. The process of claim 27, further comprising wherein at least one of entity's data is phantom data.

38. The process of claim 27, wherein at least one of the benefits is printable.

39. The process of claim 27, wherein at least a sub-set of an entity's data is received from one or more of the group consisting of computer, telephone, fax machine, touch screen, television, cell phone, TDD, or PDA.

40. The process of claim 27, wherein at least a sub-set of an entity's data is received from at least one web-enabled phone.

41. The process of claim 27, wherein at least one benefit provider is from the group consisting of a company/business, a government, a non-profit/charity, an educational institution, or a private individual.

42. A technology and computing improving, tangible, non-abstract process for permitting an entity to make use of benefits, the process comprising:
  receiving in at least one physical memory device (i) at least a sub-set of an entity's demographic, geographic, and psychographic data, (ii) benefit data for benefits which are offered to those entities meeting the specified qualifications and eligibility requirements as established by the benefit providers, and (iii) benefit provider data;
  storing in a physical memory device (i) the entity data, (ii) the benefit data, and (iii) the benefit provider data;
  inputting (i) the entity's data, (ii) the benefit data, and (iii) the benefit provider data into a processing device by means of at least one data entry device in electronic communication with the processing device;
  said processing device analyzing (i) the entity's data, (ii) the benefit data, and (iii) the benefit provider data to determine whether any benefit providers are offering any benefits applicable to the entity's data;
  determining that the entity qualifies for at least one benefit from at least one benefit provider;
  generating a message to a receiving device which informs the entity of one or more benefits applicable to the entity's data;
  wherein at least one benefit is from the group consisting of a coupon, a discount, a giveaway, a free premium, free merchandise, a rebate, a certificate, a grant, a bonus, an award, reduced interest-rate real estate financing; a reduced or zero down payment real estate loan; a free or reduced-cost prescription, free or reduced-cost medical care/treatment, a reduced price or financing for cars or other transportation; traveling and vacationing at reduced cost or for free.

43. The process of claim 42, wherein the receiving device is a wireless device.

44. The process of claim 42, wherein the receiving device is a web-enabled phone.

45. The process of claim 42, wherein the receiving device is a touch screen device.

46. The process of claim 42, wherein at least one benefit is available to entity based at least in part on the physical proximity of the entity to one or more of the benefit providers.

47. The process of claim 42, wherein the entity utilizes at least one of the benefits.

48. The process of claim 42, wherein at least one of the benefits provided by at least one of the benefit providers is received directly into the system.

49. The process of claim 42, wherein at least one of the benefits provided by at least one of the benefit providers is received into the system from a third-party intermediary acting on behalf of at least one of the benefit providers.

50. The process of claim 42, further comprising generating a message to a receiving device notifying the entity of at least one of the following:
  (i) a modification or elimination of at least one of the benefits;
  (ii) the availability of at least one new benefit;
  (iii) the pending modification or elimination of at least one existing benefit;
  (iv) the pending availability of at least one new benefit.

51. The process of claim 42, further comprising supplying to a receiving device at least one benefit application form required by at least one of the benefit providers.

52. The process of claim 42, further comprising receiving entity's social security or other tax ID number in order to receive at least one benefit from at least one benefit provider.

53. The process of claim 42, further comprising wherein at least one of entity's data is phantom data.

54. The process of claim 42, wherein at least one of the benefits is printable.

55. The process of claim 42, wherein at least a sub-set of an entity's data is received from; and/or benefits data delivered to; one or more of the group consisting of computer, telephone, fax machine, touch screen, television, cell phone, TDD, or PDA.

56. The process of claim 42, wherein at least a sub-set of an entity's data is received from at least one web-enabled phone.

57. The process of claim 42, wherein at least one benefit provider is from the group consisting of a company/business, a government, a non-profit/charity, an educational institution, or a private individual.

58. The process of claim 42:
  wherein at least one benefit is available to entity based at least in part on the physical proximity of the entity to one or more of the benefit providers; and
  wherein at least one of the benefits provided by at least one of the benefit providers is received into the system from a third-party intermediary acting on behalf of at least one of the benefit providers; and
  wherein at least one benefit provider is from the group consisting of a company/business, a government, a non-profit/charity, an educational institution, or a private individual; and
  wherein at least one of the benefits is printable.

59. The process of claim 42, further comprising generating to a receiving device at least one from the group consisting of:
  at least one benefit application form required by at least one of the benefit providers;
  a communication connection to at least one of the benefit providers;
  an approval of entity to receive one or more benefits from one or more benefit providers;
  an acknowledgement of an acceptance of at least one of the benefits by the entity;
  a notification of the utilization of at least one benefit by the entity.

60. The process of claim 42, wherein the entity's one or more benefits and/or information concerning such benefit(s) is shared with at least one other entity via the system.

61. The process of claim 42, wherein the entity qualifies for at least one additional benefit; or for an improvement in the terms and/or conditions of at least one benefit; through the aggregation of the entity with at least one additional entity.

62. The process of claim 42, further comprising entity data which also includes entity identification data.

63. The process of claim 42, further comprising the storing within the system of some portion of the entity's benefits.

64. The process of claim 42, further comprising notifying the entity by a receiving device of one or more benefits the entity previously did not qualify to receive, but; due to one or more modifications made by one or more of the benefit providers in one or more of their benefit qualification/eligibility requirements; for which the entity now does qualify to receive.

65. The process of claim 42, further comprising requiring the entity to update entity data as a condition of the entity continuing to receive benefits.

66. The process of claim 42, wherein the receiving device is portable.

67. The process of claim 42, further comprising generating to the receiving device a map and/or directions to at least one of the benefit providers.

68. A technology and computing improving, tangible, non-abstract process for permitting 1,000 or more entities to make use of benefits, the process comprising:
   receiving in at least one physical memory device (i) at least a sub-set of each of the 1,000 or more entities' demographic, geographic, and psychographic data, (ii) benefit data for each of 100 or more benefits where each benefit is offered to those entities meeting the specified qualifications and eligibility requirement as established by the benefit providers, and (iii) benefit provider data for each of the 100 or more benefits;
   storing in a physical memory device (i) the 1,000+ entities' data, (ii) the 100+ benefits data, and (iii) the 100+ benefit providers' data;
   inputting (i) the 1,000+ entity's data, (ii) the 100+ benefits data, and (iii) the 100+ benefit providers' data into a processing device by means of at least one data entry device in electronic communication with the processing device;
   said processing device analyzing (i) the 1,000+ entity's data, (ii) the 100+ benefits data, and (iii) the 100+ benefit providers' data to determine whether any benefit providers are offering any benefits available to any of the 1,000+ entities' data;
   generating a message to each of 100 or more receiving devices informing 100+ of the 1,000+ entities of one or more benefits available to each of the 100+ entities' data;
   wherein one or more of the benefits available to each of the 100+ entities is from the group consisting of a coupon, a discount, a giveaway, a free premium, free merchandise, a rebate, a certificate, a grant, a bonus, an award, reduced interest-rate real estate financing; a reduced or zero down payment real estate loan; a free or reduced-cost prescription, free or reduced-cost medical care/treatment, a reduced price or financing for cars or other transportation; traveling and vacationing at reduced cost or for free.

69. The process of claim 68, further comprising:
   receiving data indicating when each of the 100+ entities are at each entity's respective new geographic locations; and then
   generating messages to each of the 100+ entity's respective web-enabled phones, informing each of these 100+ new-geographic-location entities of at least one new, different, individualized benefit which is now available to each of the 100+ entities due at least in part to each entity's respective, new geographic locations;
   wherein one or more of the new-geographic, new, different, individualized benefits available to each of the 100+ entities are printable.

70. A computer-readable storage medium having stored thereon instructions that, when executed, cause a processor to:
   receive (i) at least a sub-set of an entity's demographic, geographic, and psychographic data, (ii) benefit data including benefit qualifying data for benefits which are offered to those entities meeting the specified qualifications and eligibility requirements as established by the benefit providers, and (iii) benefit provider data;
   store (i) the entity data, (ii) the benefit data including benefit qualifying data, and (iii) the benefit provider data;
   analyze (i) the entity's data, (ii) the benefit data including benefit qualifying data, and (iii) the benefit provider data to determine whether any benefit providers are offering any benefits applicable to the entity's data;
   determine that the entity qualifies for at least one benefit from at least one benefit provider;
   generate a message to a web-enabled receiving device which informs the entity of one or more benefits applicable to the entity's data;
   wherein at least one benefit provider is from the group consisting of a company/business, a government, a non-profit/charity, an educational institution, or a private individual; and
   wherein at least one benefit is from the group consisting of a coupon, a discount, a giveaway, a free premium, free merchandise, a rebate, a certificate, a grant, a bonus, an award, reduced interest-rate real estate financing; a reduced or zero down payment real estate loan; a free or reduced-cost prescription, free or reduced-cost medical care/treatment, a reduced price or financing for cars or other transportation; traveling and vacationing at reduced cost or for free.

71. The computer-readable storage medium of claim 70, further comprising instructions that:
   receive data indicating at least one change in entity's data;
   store this changed data;
   analyze this changed data in combination with entity's other, unchanged data;
   determine that the entity qualifies for at least one benefit from at least one benefit provider; and
   generate a message to a web-enabled receiving device which informs the entity of the benefit(s) now applicable to entity's data.

72. The computer-readable storage medium of claim 70, wherein at least one benefit is available to entity based at least in part on the physical proximity of the entity to one or more of the benefit providers.

73. The computer-readable storage medium of claim 70, further comprising instructions that:
   receive data indicating at least one change in the benefit qualifying data of at least one benefit;
   store this changed data;
   analyze this changed qualifying data in combination with the benefit's unchanged qualifying data and entity's data;
   determine that the entity qualifies for at least one benefit from at least one benefit provider; and generate a message to a web-enabled receiving device which informs the entity of the benefit(s) now applicable to entity's data.

74. The computer-readable storage medium of claim 70, further comprising instructions that generate a message to a web-enabled receiving device notifying the entity of at least one from the group consisting of:
  (i) a modification or elimination of at least one of the benefits;
  (ii) the availability of at least one new benefit;
  (iii) the pending modification or elimination of at least one existing benefit;
  (iv) the pending availability of at least one new benefit.

75. The computer-readable storage medium of claim 71, further comprising instructions that generate to the web-enabled receiving device a map and/or directions to at least one of the benefit providers.

76. A web-enabled computing device comprising a GUI, the computing device being configured to:
  display on the GUI at least one benefit for which an entity qualifies to receive as a result of entity meeting the specified qualifications and eligibility requirements as established by one or more benefit provider(s);
  display on the GUI the name of at least one of the benefit providers for whose benefit(s) the entity has qualified for;
  upon a change in one or more of entity's demographic, geographic, or psychographic data, display on the GUI at least one new, different benefit which entity did not previously qualify to receive, but that, as a result of the one or more said changes in entity's data, does now qualify to receive;
  wherein at least one benefit provider is from the group consisting of a company/business, a government, a non-profit/charity, an educational institution, or a private individual;
  wherein at least one benefit is from the group consisting of a coupon, a discount, a giveaway, a free premium, free merchandise, a rebate, a certificate, a grant, a bonus, an award, reduced interest-rate real estate financing; a reduced or zero down payment real estate loan; a free or reduced-cost prescription, free or reduced-cost medical care/treatment, a reduced price or financing for cars or other transportation; traveling and vacationing at reduced cost or for free.

77. The web-enabled computing device of claim 76, wherein at least one of entity's data is phantom data.

78. The web-enabled computing device of claim 76, further configured to display on the GUI a map and/or directions to at least one of the benefit providers.

79. The web-enabled computing device of claim 76, wherein at least one benefit is available to entity based at least in part on the physical proximity of the entity to one or more of the benefit providers.

80. The web-enabled computing device of claim 76, further configured to display on the GUI at least one benefit application form.

81. The web-enabled computing device of claim 76, wherein at least one of the benefits is printable.

* * * * *